(12) United States Patent
Ibayashi et al.

(10) Patent No.: US 10,328,630 B2
(45) Date of Patent: Jun. 25, 2019

(54) MESH STRUCTURE

(71) Applicant: JXTG Nippon Oil & Energy Corporation, Tokyo (JP)

(72) Inventors: Kunihiko Ibayashi, Tokyo (JP); Hisao Ito, Chiba (JP)

(73) Assignee: JXTG Nippon Oil & Energy Corporation (JP)

( * ) Notice: Subject to any disclaimer, the term of this patent is extended or adjusted under 35 U.S.C. 154(b) by 358 days.

(21) Appl. No.: 15/178,789

(22) Filed: Jun. 10, 2016

(65) Prior Publication Data
US 2016/0361902 A1 Dec. 15, 2016

(30) Foreign Application Priority Data
Jun. 10, 2015 (JP) .................................. 2015-117496

(51) Int. Cl.
*B29C 55/04* (2006.01)
*B29C 55/28* (2006.01)
(Continued)

(52) U.S. Cl.
CPC ............ *B29C 55/045* (2013.01); *B29C 55/28* (2013.01); *B29C 48/0018* (2019.02);
(Continued)

(58) Field of Classification Search
CPC ..... B29C 55/045; B29C 55/28; B29C 47/065; B29C 47/0066; B29C 47/0057;
(Continued)

(56) References Cited

U.S. PATENT DOCUMENTS

| 2,728,950 A | 1/1956 | Annesser |
| 3,662,935 A | 5/1972 | Yazawa et al. |

(Continued)

FOREIGN PATENT DOCUMENTS

| GB | 849436 A | 9/1960 |
| JP | 51038980 | 9/1976 |

(Continued)

OTHER PUBLICATIONS

Japanese Office Action for Application No. 2015-117496 dated Jul. 27, 2018, 3 pages.

*Primary Examiner* — Cephia D Toomer
(74) *Attorney, Agent, or Firm* — Lerner, David, Littenberg, Krumholz & Mentlik, LLP

(57) ABSTRACT

Provided is a lightweight mesh nonwoven fabric having excellent adhesiveness between uniaxially oriented bodies, excellent low-temperature heat sealability, and high strength. A mesh structure 1 includes two or more uniaxially oriented bodies 2, 3; which include a thermoplastic resin layer and a linear low-density polyethylene layer laminated on at least one side of the thermoplastic resin layer; the mesh structure is produced by laminating or weaving the uniaxially oriented bodies through the linear low-density polyethylene layer in such a way that orientation axes L, T of the uniaxially oriented bodies cross; and the mesh structure has properties of: (1) a fiber weight per unit area of 5 to 70 g/m², (2) a thickness of the linear low-density polyethylene layer of 2 to 10 μm, (3) an adhesive force between the uniaxially oriented bodies of 10 to 60 N, and (4) a tensile strength of 20 to 600 N/50mm.

6 Claims, 5 Drawing Sheets

(51) Int. Cl.
    *B29C 35/08*       (2006.01)
    *B29K 23/00*       (2006.01)
    *B29C 48/00*       (2019.01)
    *B29C 48/21*       (2019.01)
    *B29L 28/00*       (2006.01)
    *B32B 5/02*        (2006.01)
    *B32B 7/02*        (2019.01)
    *B32B 7/12*        (2006.01)
    *B32B 27/32*       (2006.01)
    *B32B 3/26*        (2006.01)
    *B29C 48/08*       (2019.01)
    *B29C 48/10*       (2019.01)
    *B29C 48/14*       (2019.01)
    *B29C 48/025*      (2019.01)
    *B29C 48/49*       (2019.01)
    *B29C 48/91*       (2019.01)

(52) U.S. Cl.
    CPC ...... *B29C 48/0022* (2019.02); *B29C 48/0255* (2019.02); *B29C 48/08* (2019.02); *B29C 48/10* (2019.02); *B29C 48/1472* (2019.02); *B29C 48/1474* (2019.02); *B29C 48/21* (2019.02); *B29C 48/49* (2019.02); *B29C 48/91* (2019.02); *B29C 2035/0822* (2013.01); *B29C 2791/007* (2013.01); *B29C 2793/0063* (2013.01); *B29K 2023/0633* (2013.01); *B29L 2028/00* (2013.01); *B32B 3/266* (2013.01); *B32B 5/022* (2013.01); *B32B 7/02* (2013.01); *B32B 7/12* (2013.01); *B32B 27/32* (2013.01); *B32B 27/327* (2013.01); *B32B 2307/31* (2013.01); *B32B 2307/514* (2013.01); *B32B 2307/516* (2013.01); *B32B 2307/54* (2013.01); *B32B 2307/542* (2013.01); *B32B 2307/718* (2013.01); *B32B 2307/732* (2013.01); *B32B 2410/00* (2013.01); *B32B 2439/06* (2013.01); *B32B 2459/00* (2013.01)

(58) Field of Classification Search
    CPC ............ B29C 2035/0822; B29C 47/56; B29C 47/0021; B29C 47/0026; B29C 47/009; B29C 47/0092; B29C 47/084; B29C 47/8805; B29C 2791/007; B29C 2793/0063; B29K 2023/0633; B29L 2028/00; B32B 2307/64; B32B 2307/516; B32B 5/022; B32B 7/02; B32B 7/12; B32B 27/32; B32B 27/327; B32B 3/266; B32B 2307/31; B32B 2307/514; B32B 2307/542; B32B 2307/718; B32B 2307/732; B32B 2410/00
    See application file for complete search history.

(56) References Cited

U.S. PATENT DOCUMENTS

| | | |
|---|---|---|
| 3,693,851 A | 9/1972 | Yazawa |
| 4,489,630 A | 12/1984 | Okada et al. |
| 4,530,914 A | 7/1985 | Ewen et al. |
| 4,540,753 A | 9/1985 | Cozewith et al. |
| 4,542,199 A | 9/1985 | Kaminsky et al. |
| 4,544,762 A | 10/1985 | Kaminsky et al. |
| 4,769,510 A | 9/1988 | Kaminsky et al. |
| 4,937,299 A | 6/1990 | Ewen et al. |
| 5,324,800 A | 6/1994 | Welborn, Jr. et al. |
| 5,580,939 A | 12/1996 | Ewen et al. |
| 5,633,394 A | 5/1997 | Welborn, Jr. et al. |
| 5,861,202 A * | 1/1999 | Kimura ................ B32B 27/32 |
| | | 428/105 |

FOREIGN PATENT DOCUMENTS

| | | |
|---|---|---|
| JP | 57030368 B2 | 6/1982 |
| JP | 58019309 | 2/1983 |
| JP | 59023011 | 2/1984 |
| JP | 59095292 | 6/1984 |
| JP | 60035006 | 2/1985 |
| JP | 60035007 | 2/1985 |
| JP | 60035008 | 2/1985 |
| JP | 60035009 | 2/1985 |
| JP | 61011757 B | 4/1986 |
| JP | 61130314 | 6/1986 |
| JP | 3163088 | 7/1991 |
| JP | H06116856 A | 4/1994 |
| JP | 8169076 | 7/1996 |
| JP | H08281888 A | 10/1996 |
| JP | H11156986 A | 6/1999 |
| JP | 2983584 B2 | 11/1999 |
| JP | 2009001776 | 1/2009 |
| WO | 1993008221 A2 | 4/1993 |

* cited by examiner

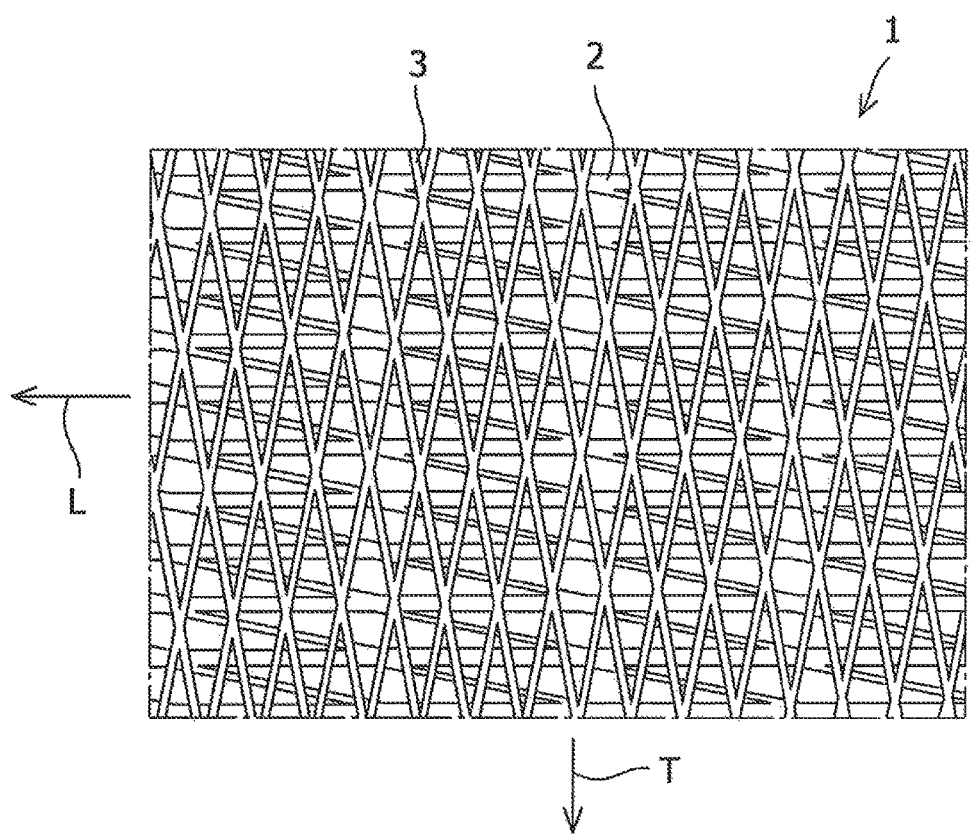

MESH STRUCTURE

CROSS-REFERENCE TO RELATED APPLICATIONS

This application claims priority from Japanese Patent Application No. 2015-117496 filed on Jun. 10, 2015, the disclosure of which is hereby incorporated herein by reference.

BACKGROUND OF THE INVENTION

1. Field of the Invention

The present invention relates to a mesh structure. The present invention specifically relates to a mesh structure that has excellent adhesive force between uniaxially oriented bodies constituting the mesh structure and is suitably used as a reinforcing material.

2. Description of Related Art

Conventionally, a multilayer film prepared by laminating low-density polyethylene produced by high pressure radical polymerization on each side of a high-density polyethylene film is stretched and split to yield mesh film, then the mesh films are laminated in such a way that the orientation axes cross and are subjected to thermo-compression bonding, and consequently polyethylene nonwoven fabrics have been developed. Separately, the multilayer film is cut before or after stretching to give stretched tapes, then the tapes are woven, and consequently woven fabrics have been developed. These nonwoven fabrics or woven fabrics are used for bags for vegetables sold in shops, various bags, covering materials for agricultural use, and agricultural materials. In addition, such fabrics are integrated with other materials and are used for reinforced bags and tapes, for example.

Patent Document 1 discloses a method for producing a mesh nonwoven fabric that is produced by laminating a uniaxially oriented body (longitudinal web) made of a thermoplastic resin oriented in the longitudinal direction (length direction) on another uniaxially oriented body (lateral web) made of a thermoplastic resin oriented in the lateral direction (width direction). The mesh nonwoven fabric is produced as follows: a longitudinal web and a lateral web are separately prepared, then are overlapped each other, and are pressurized and heated to be integrated.

This kind of mesh nonwoven fabric has characteristics of light weight, good breathability, high strength in both longitudinal and lateral directions, excellent balance, and high toughness. The fabrics also have excellent characteristics of water resistance and chemical resistance.

[Patent Document 1] Japanese Patent No. 2983584

In recent years, in order to expand the application of mesh nonwoven fabrics to reinforcing materials and the like, there is a demand for mesh nonwoven fabrics having higher strength and higher adhesive force between uniaxially oriented bodies, for example, between the fibers constituting a longitudinal web and the fibers constituting a lateral web. As bag making has been performed at higher speed, there is another demand for improvement in low-temperature heat sealability and in the adhesive strength of a sealed portion. As the weights of containers and packing materials have been reduced, there is still another demand for lighter weight and higher strength. However, if having lighter weight, mesh nonwoven fabrics are more flexible and softer and have no rigidity or strength, which is one of the characteristics thereof. It is thus difficult to satisfy both light weight and high strength. On this account, weight reduction results in limitation of the application or poor processability such as bag making and creasing. In addition, the tensile strength is insufficient for reinforcement applications, and fibers constituting a uniaxially oriented body are peeled off. Thus, a practically sufficient reinforcement effect is not achieved in some cases.

A possible solution for reducing the weight and increasing the rigidity and tensile strength is that the thickness of the low-density polyethylene layer as the outer layer of a uniaxially oriented body is reduced and the ratio of the thermoplastic resin layer as the main layer is increased. However, when the thickness of each adhesion layer as the outer layer of the uniaxially oriented body is reduced, the adhesive force between the uniaxially oriented bodies is reduced, impairing the adhesive strength.

SUMMARY OF THE INVENTION

The inventors of the present invention have performed intensive research in order to solve the problems and, as a result, have completed a mesh nonwoven fabric that has higher adhesive strength between uniaxially oriented bodies even when low-density polyethylene layers have small thicknesses, has sufficient tensile strength and higher heat sealability, and is suitable for reinforcing materials, and have completed a reinforced laminate, by improving the low-density polyethylene layer laminated on at least one side of the thermoplastic resin layer. The present invention is a mesh structure including two or more uniaxially oriented bodies. The uniaxially oriented body includes a thermoplastic resin layer and a linear low-density polyethylene layer laminated on at least one side of the thermoplastic resin layer. The mesh structure is produced by laminating or weaving the two or more uniaxially oriented bodies through the linear low-density polyethylene layer in such a way that orientation axes of the two or more uniaxially oriented bodies cross. The mesh structure has properties of:

(1) a fiber weight per unit area of 5 to 70 $g/m^2$,
(2) a thickness of the linear low-density polyethylene layer of 2 to 10 $\mu m$,
(3) an adhesive force between the uniaxially oriented bodies of 10 to 60 N, and
(4) a tensile strength of 20 to 600 N/50 mm.

In the mesh structure, it is preferable that the thermoplastic resin layer contain a high-density polyethylene having a melting point higher than a melting point of the linear low-density polyethylene layer.

In the mesh structure, it is preferable that the uniaxially oriented body be produced by uniaxially stretching a multilayer film prepared by inflation molding.

In the mesh structure, it is preferable that the linear low-density polyethylene layer contain a linear low-density polyethylene prepared by polymerization with a metallocene catalyst.

In the mesh structure, it is preferable that the linear low-density polyethylene layer contain a linear low-density polyethylene having a long-chain branch in a molecular chain thereof.

In the mesh structure, it is preferable that the uniaxially oriented body include a first linear low-density polyethylene layer laminated on one side of the thermoplastic resin layer and a second linear low-density polyethylene layer laminated on another side of the thermoplastic resin layer, and the first and second linear low-density polyethylene layers contain a linear low-density polyethylene having an MFR of 0.5 to 10 g/10 min and a density of 0.910 to 0.940 g/cm3.

In the mesh structure, it is preferable that the two or more uniaxially oriented bodies be a uniaxially oriented mesh film, uniaxially oriented tapes, or both the uniaxially oriented mesh film and the uniaxially oriented tapes.

In the present invention, a linear low-density polyethylene layer is used as at least one outer layer of a uniaxially oriented body, and the linear low-density polyethylene layer has a smaller thickness. This can relatively increase the ratio of the comparatively hard thermoplastic resin layer in the uniaxially oriented body. The structure has a fiber weight per unit area of 5 to 70 g/m2, and thus a mesh nonwoven fabric ranging from a lightweight to a mesh nonwoven fabric having a comparatively heavyweight can also be produced. The linear low-density polyethylene layer has large adhesive force, and thus high adhesive force can be achieved. In this manner, by using the linear low-density polyethylene, the ratio of the thermoplastic resin layer is increased, and thus the tensile strength is improved. The invention has further advantages that the linear low-density polyethylene layer can compensate for a reduction in adhesive strength.

BRIEF DESCRIPTION OF THE DRAWINGS

FIG. 1 is a plan view showing a first mesh structure in an embodiment of the present invention.

DESCRIPTION OF PREFERRED EMBODIMENTS

Figure 2A:
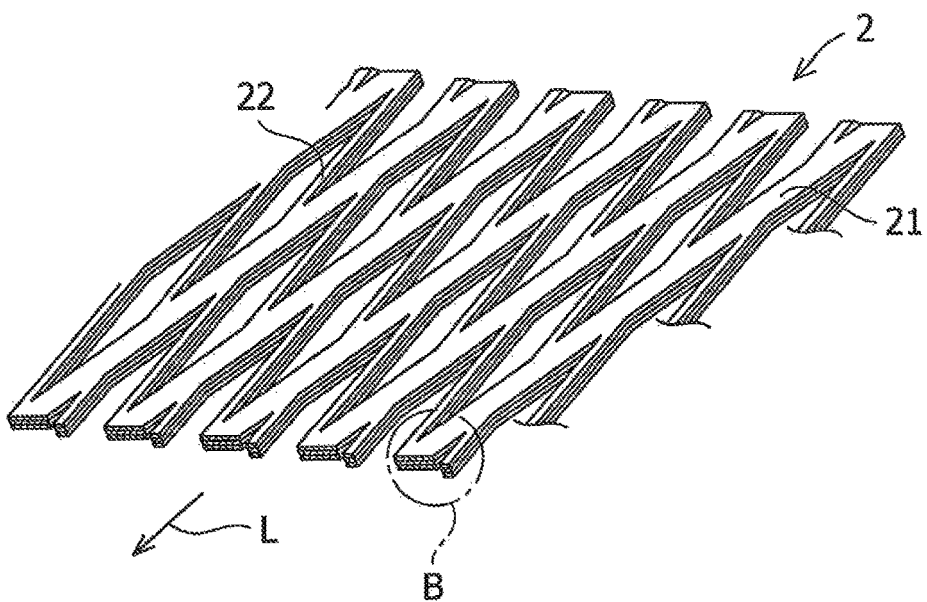
FIG. 2(A) is a perspective view showing a configuration example of a uniaxially oriented body constituting the mesh structure shown in FIG. 1.

Embodiments of the present invention will now be described with reference to drawings. However, the present invention is not intended to be limited to the embodiments.
First Embodiment: Mesh Structure According to a first embodiment of the present invention, a mesh structure includes two or more uniaxially oriented bodies. The uniaxially oriented body includes a thermoplastic resin layer and a linear low-density polyethylene layer laminated on at least one side of the thermoplastic resin layer. The mesh structure is produced by laminating or weaving the two or more uniaxially oriented bodies through the linear low-density polyethylene layer in such a way that the orientation axes of the two or more uniaxially oriented bodies cross. The mesh structure has the properties of:

(1) a fiber weight per unit area of 5 to 70 g/m$^2$,
(2) a thickness of the linear low-density polyethylene layer of 2 to 10 μm,
(3) an adhesive force between the uniaxially oriented bodies of 10 to 60 N, and
(4) a tensile strength of 20 to 600 N/50 mm.

The tensile strength used herein is a tensile strength in at least one direction. For example, the tensile strength is a tensile strength in the oriented direction of at least one uniaxially oriented body of the two or more uniaxially oriented bodies. In an embodiment, the tensile strength is a tensile strength in at least one direction of a longitudinal direction (also called machine direction, length direction, feed direction, or flow direction) and a lateral direction (also called width direction) when a uniaxially oriented body or a mesh structure is produced.

First, the layer structure of a uniaxially oriented body constituting the mesh structure of the present invention and the composition of each layer will be described. The uniaxially oriented body includes a thermoplastic resin layer and a linear low-density polyethylene layer laminated on at least one side of the thermoplastic resin layer.

The thermoplastic resin layer is a layer containing a thermoplastic resin as a main component. The thermoplastic resin is exemplified by polyolefins such as polyethylene and polypropylene and copolymers of them, having good splitting performance. Preferred is a high-density polyethylene.

The thickness of the thermoplastic resin layer is not limited to particular values, and can be appropriately set by a person skilled in the art so as to achieve an intended fiber weight per unit area when the thickness of the linear low-density polyethylene layer is made to be in a desired range described later. The thickness of the thermoplastic resin layer may be about 20 to 70 μm and is preferably 25 to 60 μm. The thickness is a thickness after uniaxial orientation.

The linear low-density polyethylene layer is a layer containing a linear low-density polyethylene having a melting point lower than that of the thermoplastic resin, as a main component. The difference between the melting point of the linear low-density polyethylene layer and the melting point of the thermoplastic resin layer is required to be 5° C. or more for production reasons and is preferably 10 to 50° C. The linear low-density polyethylene layer functions as an adhesion layer to another uniaxially oriented body and thus may also be called an adhesion layer.

The linear low-density polyethylene is preferably prepared by polymerization with a metallocene catalyst. The metallocene catalyst is what is called a single site catalyst comparatively having a single active site, and is a catalyst that contains at least a group IV transition metal compound containing a ligand having a cyclopentadienyl skeleton. Typical examples include transition metal metallocene complexes such as catalysts prepared by reacting a biscyclopentadienyl complex of zirconium or titanium with methylaluminumoxane or the like as a co-catalyst. The metallocene catalyst is a homogeneous or heterogeneous catalyst prepared by variously combining various complexes, co-catalysts, carriers, and the like. The metallocene catalyst is exemplified by known catalysts disclosed in JP-A 58-19309, 59-95292, 59-23011, 60-35006, 60-35007, 60-35008, 60-35009, 61-130314, and 3-163088.

The linear low-density polyethylene can be prepared by copolymerizing ethylene and an α-olefin in the presence of such a metallocene catalyst by a production process such as gas phase polymerization, slurry polymerization, and solution polymerization. For the copolymer, an α-olefin having 4 to 12 carbon atoms is preferably used. Examples of the α-olefin specifically include butene, pentene, hexene, heptene, octene, nonene, and decene.

As for the more specific production conditions of the linear low-density polyethylene, the linear low-density polyethylene can be produced by polymerizing ethylene and an α-olefin in, for example, substantially oxygen-free and water-free conditions in the presence of an inert hydrocarbon solvent selected from aliphatic hydrocarbons such as hexane and heptane, aromatic hydrocarbons such as benzene, toluene, and xylene, and alicyclic hydrocarbons such as cyclohexane and methylcyclohexane. The polymerization temperature can be selected from a range of 0 to 300° C., the polymerization pressure can be selected from a range of atmospheric pressure to about 100 kg/cm2, and the polymerization time can be selected from a range of 1 minute to 10 hours.

The linear low-density polyethylene polymerized by using the metallocene catalyst differs from, for example, copolymers prepared by using a Ziegler catalyst or a Philips catalyst in properties, and has characteristics of a comparatively small molecular weight distribution and almost equal branch densities of molecular chains. The polymerization with a metallocene catalyst into a linear low-density polyethylene is described in detail in JP-A 2009-1776 and JP-A 8-169076 by the present applicant, for example. A person skilled in the art can produce a linear low-density polyethylene in the presence of a metallocene catalyst in accordance with these publications or other related arts. Alternatively, a commercially available linear low-density polyethylene prepared by polymerization with a metallocene catalyst can also be used.

The linear low-density polyethylene is more preferably a long-chain branch type linear low-density polyethylene prepared by polymerization with a metallocene catalyst. A linear low-density polyethylene having long-chain branches with more than 20 carbon atoms has both flexibility and processability and thus is particularly advantageous from the viewpoint of production of the mesh structure. The long-chain branch type linear low-density polyethylene can be appropriately synthesized by a person skilled in the art in accordance with a known method, and a commercially available long-chain branch type linear low-density polyethylene can also be used. The introduction method of a long-chain branch is exemplified by a method of directly copolymerizing ethylene and an α-olefin using a metallocene catalyst. Examples of the metallocene catalyst used in this case include a catalyst using a complex having a cross-linked biscyclopentadienyl ligand, a catalyst using a complex having a cross-linked bisindenyl ligand, a catalyst using a constrained geometry catalyst, and a catalyst using a complex having a benzoindenyl ligand. A method using a complex having a cross-linked (cyclopentadienyl)(indenyl) ligand is also preferred for the generation of a long-chain branch. In these methods, the type of complex, the preparation conditions of a catalyst, and the polymerization conditions can be appropriately selected to control the quality and quantity of a long-chain branch.

The linear low-density polyethylene preferably has a melt flow rate of 0.5 to 10 g/10 min and more preferably 1 to 5 g/10 min. If the melt flow rate is less than 0.5 g/10 min, the pressure load at the time of molding may become large in some cases. If the melt flow rate is more than 10 g/10 min, the linear low-density polyethylene may have poor film formation stability and thus is unfavorable in some cases. The density is preferably 0.910 to 0.940 g/cm3 and more preferably 0.915 to 0.930 g/cm3. If the density is out of the range, the heat welding between uniaxially oriented bodies may be difficult, and such a linear low-density polyethylene may be unfavorable in some cases.

The linear low-density polyethylene layer preferably has a thickness of 2 to 10 μm, more preferably 2 to 9 μm, and even more preferably 2 to 7 μm. If the thickness is less than 2 μm, a sufficient adhesive force may be achieved. If the thickness is more than 10 μm, the tensile strength may be accordingly deteriorated, and a resulting structure may become soft and may fail to achieve a sufficient effect as a reinforcing material. The thickness is a layer thickness after uniaxial orientation.

The resins constituting the thermoplastic resin layer and the linear low-density polyethylene layer may include other resins such as a high-pressure low-density polyethylene (LDPE) in addition to the above main components as long as the characteristics are not impaired, and may contain known additives. Examples of the additive include antioxidants, weathering agents, lubricants, antiblocking agents, antistatic agents, antifogging agents, non-dripping agents, pigments, and fillers.

The linear low-density polyethylene layer may be laminated on one side of the thermoplastic resin layer or may be laminated on both sides of the thermoplastic resin layer. When the linear low-density polyethylene layers are laminated on both sides of the thermoplastic resin layer, the respective layers can be called a first linear low-density polyethylene layer and a second linear low-density polyethylene layer. The first linear low-density polyethylene layer and the second linear low-density polyethylene layer may have the same composition and the same thickness or have different compositions and different thicknesses. Each of the first and second linear low-density polyethylene layers preferably satisfies the above conditions of thickness and melt flow rate and also preferably satisfies the above composition conditions in the relation with the thermoplastic resin layer.

The uniaxially oriented body can be prepared by uniaxially orienting a multilayer film having such a composition and a layer structure. The uniaxially oriented body may be a uniaxially oriented mesh film or a uniaxially oriented tape, for example. Detailed embodiments and production methods thereof will be described later. The mesh structure of the present invention is produced by laminating or weaving at least two uniaxially oriented bodies, and the at least two uniaxially oriented bodies are laminated or woven in such a way that the orientation axes thereof cross. Here, the two uniaxially oriented bodies may have the same composition and the same layer structure or may have different compositions and different layer structures. Depending on characteristics of the uniaxially oriented body, the mesh structure may be a mesh nonwoven fabric or may be a woven fabric. As for the cross manner of orientation axes, the axes may substantially orthogonally cross or may cross at a certain angle. When three or more uniaxially oriented bodies are laminated, the orientation axes of the three or more oriented bodies may cross at a certain angle. Embodiments of the uniaxially oriented body and a mesh structure produced by combining the oriented bodies will be described hereinafter.

First Mesh Structure: Nonwoven Fabric Produced by Laminating Split Web and Slit Web A first mesh structure is a nonwoven fabric that is produced as follows: a longitudinal-direction uniaxially stretched multilayer film is split and then extended in the width direction to give a uniaxially oriented body; a multilayer film is slit in the width direction and then uniaxially stretched in the width direction to give another uniaxially oriented body; and the uniaxially oriented bodies are laminated in such a way that the oriented directions substantially orthogonally cross. FIG. 1 shows a mesh nonwoven fabric as an example of the mesh structure in an embodiment of the present invention. The mesh nonwoven fabric 1 is formed by laminating a split web 2 that is an example of the uniaxially oriented body crosswise with a slit web 3 that is another example of the uniaxially oriented body in such a way that the orientation axis L of the split web 2 cross with the orientation axis T of the slit web 3. The contact areas of the split web 2 and the slit web 3 adjacent to each other are bonded by face-bonding.

FIG. 2 and FIG. 3 show the split web 2 and the slit web 3, respectively, constituting the mesh nonwoven fabric 1 shown in FIG. 1. The split web 2 shown in FIG. 2A is a uniaxially oriented mesh film that is formed as follows: a multilayer film prepared by laminating a linear low-density polyethylene layer on one side or both sides of a thermoplastic resin layer is uniaxially stretched in the longitudinal direction (the axis direction of the orientation axis L of the split web 2), then is split in the longitudinal direction, and is extended in the width direction.

The split web 2 as an example of the uniaxially oriented body formed of a mesh film can be produced by a production method such as multilayer inflation molding and a multilayer T-die method. Specifically, a linear low-density polyethylene layer synthesized with a metallocene catalyst, as a preferred example of the linear low-density polyethylene, is laminated on both sides of a thermoplastic resin layer to form a multilayer film. In the following specification, the linear low-density polyethylene layer prepared by polymerization with a metallocene catalyst is also called a metallocene LLDPE layer. The multilayer film is stretched in the longitudinal direction at a stretch ratio of at least 3 and then is split (subjected to split treatment) in the same direction in a catch stitch form by using a splitter to give a mesh film. The mesh film may be further extended in the width direction to have a predetermined width, yielding the split web. By the width-extending, stem fibers 21 and branch fibers 22 are formed to give a mesh body as shown in the figures. The split web 2 has a comparatively high strength in the longitudinal direction across the width direction.

Figure 2B:
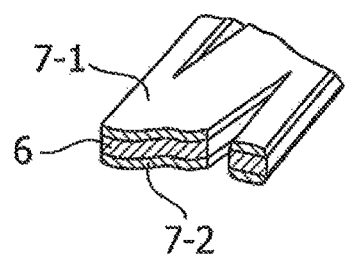
FIG. 2(B) is an enlarged perspective view of the area B surrounded by the dot-dash line in FIG. 2A.

FIG. 2B is an enlarged perspective view of the area B surrounded by the dot-dash line in FIG. 2A. The split web 2 has a three-layer structure in which metallocene LLDPE layers 7-1 and 7-2 having a melting point lower than that of a thermoplastic resin are laminated on both sides of the thermoplastic resin layer 6. One of the metallocene LLDPE layers 7-1 and 7-2 functions as an adhesion layer between webs when the split web is laminated crosswise with a slit web 3 to form a mesh nonwoven fabric 1.

Figure 3A:
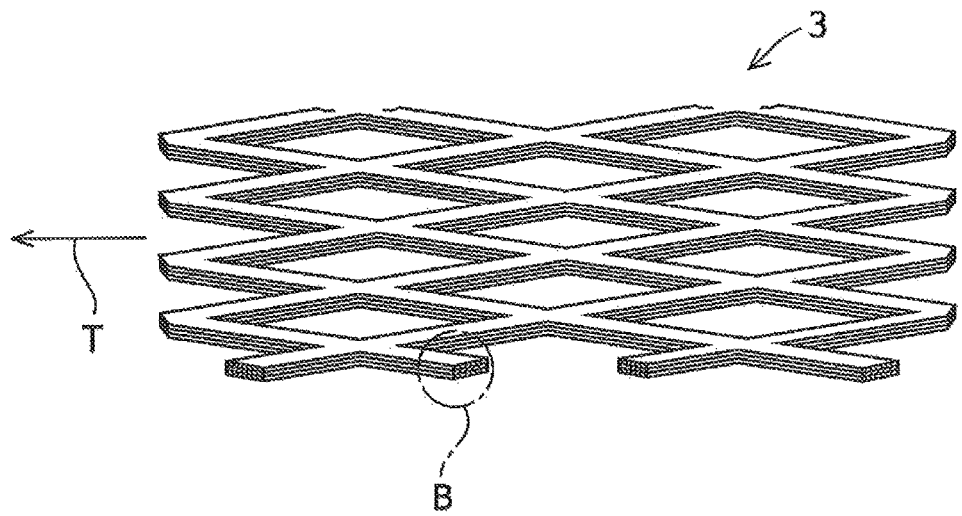
FIG. 3(A) is a perspective view showing a configuration example of a uniaxially oriented body constituting the mesh structure shown in FIG. 1.

The slit web 3 shown in FIG. 3A is a mesh film formed as follows: a large number of slits are formed in a multilayer film prepared by laminating a metallocene LLDPE layer on both sides of a thermoplastic resin layer, in the lateral direction (the axis direction of the orientation axis T of the slit web 3); and then the multilayer film with slits is uniaxially stretched in the lateral direction. Specifically, parallel slits are intermittently formed, for example, in a catch stitch form with a heated blade or the like in the lateral direction (width direction) in the multilayer film except both ear portions, and then the film with slits is stretched in the lateral direction to give the slit web 3. The slit web 3 has a comparatively high strength in the lateral direction.

Figure 3B:
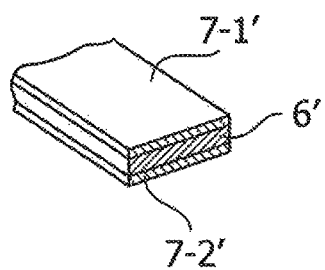
FIG. 3(B) is an enlarged perspective view of the area B surrounded by the dot-dash line in FIG. 3A.

FIG. 3B is an enlarged perspective view of the area B surrounded by the dot-dash line in FIG. 3A. The slit web 3 has a three-layer structure in which metallocene LLDPE layers 7-1' and 7-2' having a melting point lower than that of a thermoplastic resin are laminated on both sides of the thermoplastic resin layer 6'. One of these metallocene LLDPE layers 7-1' and 7-2' functions as an adhesion layer between webs when the slit web is laminated crosswise with a split web 2 to form a mesh nonwoven fabric 1.

As for the shape of the slit web, in addition to the shape shown in FIG. 3, webs having the following patterns can also be used as the uniaxially oriented mesh films: a uniaxially oriented body including stem fibers stretching parallel with each other and branch fibers connecting the adjacent stem fibers to each other, in which the stem fibers are arranged substantially in one direction, and the uniaxially oriented body is prepared by forming a large number of slits in the width direction in a raw film having substantially the same structure as the split web 2, and then stretching the film in the width direction at the same stretch ratio as in the split web 2. In other words, the shape of the slit web may be a uniaxially oriented body having a pattern rotated by ±90° with respect to the split web 2 in a plane view; and slit webs having similar patterns to this.

The three-layer structures of the uniaxially oriented bodies shown in FIGS. 2 and 3 are merely examples. In the split web 2, the metallocene LLDPE layer 7-1 can be eliminated, for example, and a two-layer structure of the thermoplastic resin layer 6 and the metallocene LLDPE layer 7-2 may be used. In the slit web 3, the metallocene LLDPE layer 7-1' can be eliminated, and a two-layer structure of the thermoplastic resin layer 6' and the metallocene LLDPE layer 7-2' may be used. Therefore, the mesh nonwoven fabric may be produced from any combination of a two-layer or three-layer split web and a two-layer or three-layer slit web.

In the present embodiment, the mesh nonwoven fabric 1 has a fiber weight per unit area of 5 to 70 g/m2, preferably 7 to 65 g/m2, and more preferably 10 to 60 g/m2. The fiber weight per unit area can be controlled by changing the thickness of the thermoplastic resin layer 6. In the present embodiment, the mesh nonwoven fabric has a tensile strength of 20 to 600 N/50 mm, preferably 30 to 550 N/50 mm, and more preferably 50 to 500 N/50 mm. The tensile strength can be controlled by changing the thickness of the thermoplastic resin layer 6. In the present embodiment, the tensile strength is a tensile strength in the longitudinal direction.

When a linear low-density polyethylene layer having a large adhesive force is used as at least one surface layer of a uniaxially oriented body and the uniaxially oriented bodies are laminated through the linear low-density polyethylene layer, an adhesive force of 10 to 60 N can be achieved between the uniaxially oriented bodies. The adhesive force used herein is a value of a test piece having a length of 200 mm and a width of 50 mm determined by using a tensile tester, and is measured as follows: a test piece is elongated in a predetermined direction at a tensile speed of 500 mm/min; and an average amplitude of load indication values at a displacement of 40 to 90 mm is regarded as the adhesive strength. Although the linear low-density polyethylene layer is softer than common low-density polyethylene layers (LD), a smaller thickness of 2 to 10 μm of the linear low-density polyethylene layer increases the ratio of the thermoplastic resin layer in the thickness of the whole uniaxially oriented body, and thus the tensile strength can be maintained.

Figure 4:
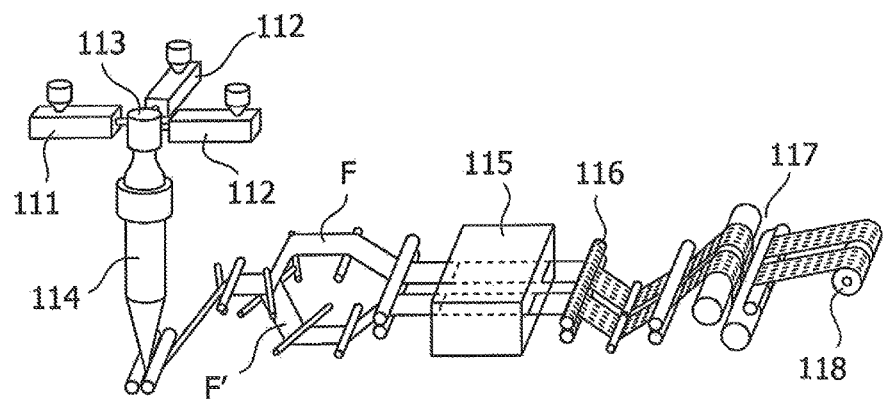
FIG. 4 is a perspective view showing a production method of the uniaxially oriented body shown in FIG. 2.
Figure 5:
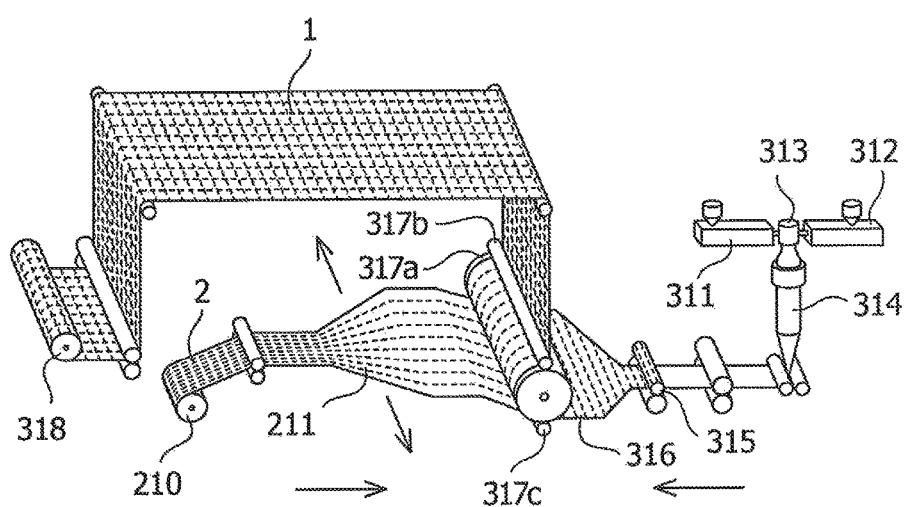
FIG. 5 is a perspective view showing a first production method of a mesh nonwoven fabric in an embodiment of the present invention.

Next, the production method of the mesh nonwoven fabric 1 shown in FIG. 1 will be described with reference to FIG. 4 and FIG. 5. FIG. 4 shows an outline of a production process of a split web 2. FIG. 5 shows an outline of a process of laminating a slit web 3 on a split web 2 to produce a mesh nonwoven fabric 1.

In a multilayer film formation step (1) in FIG. 4, a thermoplastic resin is supplied to a main extruder 111, and a linear low-density polyethylene resin as an adhesion layer resin is supplied to two sub-extruders 112. The thermoplastic resin extruded from the main extruder 111 constitutes a center layer, the adhesion layer resin extruded from the two sub-extruders 112 and 112 constitutes an inner layer and an outer layer, and the resins are subjected to inflation molding, giving a multilayer film. Here, the thermoplastic resin constitutes the layer 6 formed of a thermoplastic resin shown in FIG. 2, and the linear low-density polyethylene resin constitutes the layers 7-1 and 7-2 formed of a linear low-density polyethylene resin shown in FIG. 2. FIG. 4 shows an example of the case in which three extruders are used and resins are subjected to film formation through a multilayer tubular die 113 by using a downward-blowing water-cooled inflation 114. As the production method of the multilayer film, for example, a multilayer inflation method and a multilayer T-die method can be used, and the method is not limited to particular methods.

In an orientation step (2), the prepared tubular multilayer film is cut into two films F and F', and the films are allowed to pass through an oven 115 equipped with an infrared heater, a hot air supplier, or the like. While heated at a predetermined temperature, the films can be subjected to roll orientation by using a mirror-surface cool roller at a stretch ratio of 3 to 15, preferably 5 to 12, and more preferably 6 to 10 relative to an initial size. If the stretch ratio is less than 3, a resulting film may have an insufficient mechanical strength. If the stretch ratio is more than 15, a film may be difficult to be stretched by a usual method, and thus a problem of requiring an expensive apparatus can arise, for example. The stretching is preferably performed in multiple steps in order to suppress uneven stretching. The orientation temperature is not higher than the melting point of a thermoplastic resin in the center layer and is typically 20 to 160° C., preferably 60 to 150° C., and more preferably 90 to 140° C. The orientation is preferably performed in multiple steps.

In a split step (3), the oriented multilayer film is brought into contact with a splitter (rotary blade) 116 rotating at high speed, and the film is subjected to split treatment (splitting). Other than the above split method, a mechanical method such as a method of beating a uniaxially oriented multilayer film, a twisting method, a sliding abrasion (friction) method, and a brushing method, air jetting, ultrasonication, a laser method, or the like can be used to form an infinite number of fine slits. Of them, a rotary mechanical method is particularly preferred. Such a rotary mechanical method is exemplified by various types of splitters such as a tap screw-type splitter, a file-like rough surface splitter, and a needle roll-like splitter. For example, as the tap screw-type splitter, a splitter having a polygonal shape such as a pentagonal shape and a hexagonal shape and having 10 to 150 screw threads, preferably 15 to 100 screw threads per inch is used. As the file-like rough surface splitter, a splitter disclosed in Japanese Utility Model Publication No. 51-38980 is preferred.

The file-like rough surface splitter is prepared by processing the surface of a circular cross section axis into round file cut for ironwork or a similar rough face and adding two spiral grooves to the face at a constant pitch. Specific examples of the splitter include splitters disclosed in U.S. Pat. Nos. 3,662,935 and 3,693,851. The method of producing the split web 2 is not limited to particular methods. Examples of the method preferably include a method in which a splitter is placed between nip rolls, a uniaxially oriented multilayer film is conveyed while a tension is applied to the film, the film is brought into contact with the splitter rotating at high speed, and the film is split into a mesh film.

In the split step, the conveyance speed of the film is typically 1 to 1,000 m/min and preferably 10 to 500 m/min. The rotation speed (circumferential speed) of the splitter can be appropriately set depending on the physical properties of a film, conveyance speed, the properties of an intended split web 2, and the like, but is typically 10 to 5,000 m/min and preferably 50 to 3,000 m/min.

The film formed by such splitting is extended in the width direction if desired, and then is subjected to heat treatment 117. In a winding step 118 (4), the resulting film is then wound up into a predetermined length, and is supplied as a split web 2 that is one of raw uniaxially oriented bodies for the mesh nonwoven fabric 1.

FIG. 5 is a schematic view showing a production method of the mesh nonwoven fabric 1 in an embodiment of the present application and is a view showing a production method including a step of laminating the split web 2 made into a wound body in FIG. 4, on a slit web 3. As shown in FIG. 5, the method mainly includes (1) a film formation step of a multilayer film as a raw fabric of a slit web 3, (2) a slit step of forming slits substantially orthogonal to the length direction of the multilayer film, (3) a uniaxial orientation step of the multilayer slit film, and (4) a compression bonding step of laminating the split web 2 on the uniaxially oriented slit web 3 and subjecting the webs to thermocompression bonding.

Each step will next be described. In the multilayer film formation step (1) in FIG. 5, a thermoplastic resin is supplied to a main extruder 311, and a linear low-density polyethylene is supplied to a sub-extruder 312. The thermoplastic resin extruded from the main extruder 311 is used as an inner layer, the linear low-density polyethylene extruded from the sub-extruder 312 is used as an outer layer, and the resins are subjected to inflation molding, giving a two-layer film. Here, the thermoplastic resin constitutes the thermoplastic resin layer 6' shown in FIG. 3, and the linear low-density polyethylene constitutes the linear low-density polyethylene layers 7-1' and 7-2' shown in FIG. 3. FIG. 5 shows an example of the case in which two extruders are used and resins are subjected to film formation through a multilayer tubular die 313 by using a downward-blowing water-cooled inflation 314. As the production method of the multilayer film, for example, a multilayer inflation method and a multilayer T-die method can be used as with the example in FIG. 4, and the method is not limited to particular methods.

In the slit step (2), the prepared multilayer film is pinched to be flattened, and then is rolled to be slightly oriented. In the film, lateral slits 315 are formed in a catch stitch form substantially orthogonal to the running direction. The slitting method is exemplified by a method of cutting with a sharp blade edge such as a razor blade and a high speed rotary blade and a method of forming slits with a score cutter, a shear cutter, or the like. Specifically, a slitting method with a heated blade (heat cutter) is most preferred. Examples of such a heated blade are disclosed in JP-B No. 61-11757 and U.S. Pat. Nos. 4,489,630 and 2,728,950.

In the orientation step (3), the multilayer film after the slit treatment is subjected to uniaxial orientation 316 in the width direction. The orientation method is exemplified by a tenter method and a pulley method. The pulley method is preferred due to a compact apparatus and economic advantages. The pulley method is exemplified by methods disclosed in British Patent No. 849,436 and JP-B No. 57-30368. The conditions such as orientation temperature are the same as in the example in FIG. 4.

The slit web 3 (lateral web) as the uniaxially oriented body prepared in the above is conveyed to the thermocompression bonding step 317 (4). Meanwhile, the split web 2 (longitudinal web) as the uniaxially oriented body produced by the method shown in FIG. 4 is conveyed from a raw fabric delivery roll 210 to a width-extending step 211 at a predetermined supply speed and is extended in the width direction several-fold with the above-mentioned width-extender. The extended web is subjected to heat treatment, as necessary. The longitudinal web is laminated on the lateral web, and the webs are conveyed to a thermo-compression bonding step 317. The laminated longitudinal web and lateral web are subjected to thermo-compression bonding in such a way that the orientation axes cross. Specifically, the longitudinal web 2 and the lateral web 3 are sequentially introduced between a heat cylinder 317a having a mirror plane on the circumference surface and mirror plane rolls 317b and 317c to undergo thermo-compression bonding by applying a nip pressure to the webs, and are integrated. Accordingly, the contact areas of the longitudinal web 2 and the lateral web 3 adjacent to each other are entirely bonded by face-bonding. After defect tests such as small tear test, the bonded webs are conveyed to a winding step 318, yielding a wound body of a mesh nonwoven fabric 1 (product).

Second Mesh Structure: Nonwoven Fabric Produced by Laminating Split Webs Crosswise with Each Other A second mesh structure is a mesh nonwoven fabric that is produced as follows: a longitudinal-direction uniaxially stretched multilayer film is split and then extended in the width direction to give a uniaxially oriented body; and the uniaxially oriented bodies are laminated crosswise with each other in such a way that the oriented directions cross, preferably the oriented directions substantially orthogonally cross. In other words, the second mesh structure is a mesh nonwoven fabric in which both the laminated uniaxially oriented bodies are composed of the split web 2 described in the first mesh structure.

Figure 6:
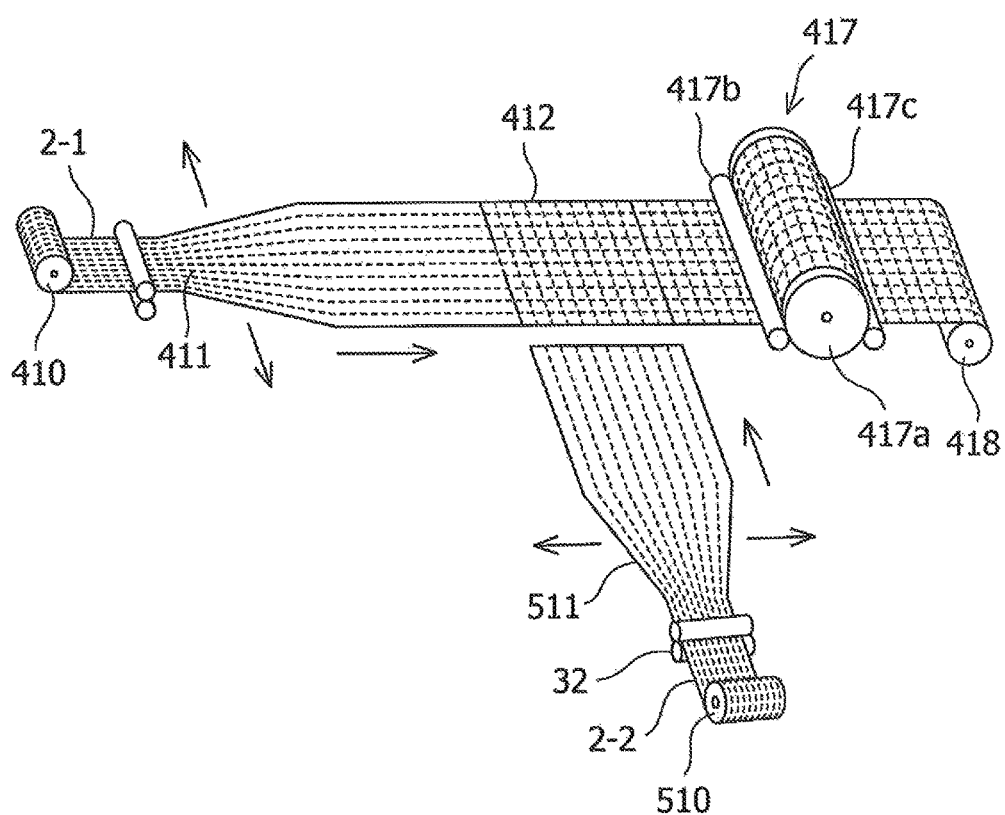
FIG. 6 is a perspective view showing a second production method of a mesh nonwoven fabric in an embodiment of the present invention.

FIG. 6 is a schematic diagram describing the production method of a nonwoven fabric as the second mesh structure. The mesh nonwoven fabric is produced by laminating split webs 2 crosswise with each other as shown in FIG. 2. In FIG. 6, a split web 2-1 (longitudinal web) produced as shown in FIG. 4 is conveyed from a raw fabric delivery roll 410 to a width-extending step 411 at a predetermined supply speed and is extended in the width direction several-fold with a width-extender (not shown). The extended web is subjected to heat treatment, as necessary.

Another split web 2-2 (lateral web) is conveyed in the same manner as for the longitudinal web from a raw fabric delivery roll 510 to a width-extending step 511 at a predetermined supply speed and is extended in the width direction several-fold with a width-extender (not shown). The extended web is subjected to heat treatment, as necessary. The web is then cut into the same length as the width of the longitudinal web 2-1, and is supplied from the direction orthogonal to the running film of the longitudinal web. In a lamination step 412, the webs are laminated crosswise with each other through each adhesion layer in such a way that the orientation axes of the respective webs orthogonally cross. In a thermo-compression bonding step 417, longitudinal web 2-1 and lateral web 2-2 laminated crosswise are sequentially introduced between a heat cylinder 417a having a mirror plane on the circumference surface and mirror plane rolls 417b and 417c, and a nip pressure is applied. Accordingly, the longitudinal web 2-1 and the lateral web 2-2 undergo thermo-compression bonding to be integrated. The contact areas of the longitudinal web 2-1 and the lateral web 2-2 adjacent to each other are entirely bonded by face-bonding. The longitudinal web 2-1 and the lateral web 2-2 integrated in this manner are wound up on a winding step 418, yielding a wound body of a laminated mesh nonwoven fabric.

The second mesh structure produced as above has substantially the same numerical value characteristics as those of the first mesh structure in terms of a fiber weight per unit area, both tensile strengths in the longitudinal direction and the lateral direction, a thickness of the linear low-density polyethylene layer, and an adhesive force, and achieves the same effect.

Third Mesh Structure: Mesh Nonwoven Fabric and Woven Fabric Produced from Uniaxially Oriented Tape A third mesh structure is a nonwoven fabric produced by laminating uniaxially oriented tapes crosswise with each other or a woven fabric produced by weaving the tapes. In other words, in the third mesh structure, both two uniaxially oriented bodies are composed of a plurality of uniaxially oriented tape groups. In the case of a nonwoven fabric, a plurality of uniaxially oriented tape groups are laminated crosswise with each other in such a way that the stretching directions substantially orthogonally cross, and are welded or bonded. In the case of a woven fabric, tape groups are woven by any weaving method in such a way that a plurality of uniaxially oriented tape groups are used as warps, and another plurality of uniaxially oriented tape groups are used as wefts, and are welded or bonded.

The uniaxially oriented tapes can be produced as follows: in the same manner as for the split web 2 as described in the first mesh structure, a raw film having a two- or three-layer structure is prepared by an extrusion molding such as a multilayer inflation method and a multilayer T-die method; then the raw film is uniaxially stretched in the longitudinal direction at a stretch ratio of 3 to 15, preferably 3 to 10; and the stretched film is cut along the stretching direction into a width of 2 to 7 mm, for example. Alternatively, a raw film having a two- or three-layer structure is prepared in the same manner; then the raw film is cut along the machine direction into the same width as the above; and the cut film is uniaxially stretched in the longitudinal direction at a stretch ratio of 3 to 15, preferably 3 to 10, yielding uniaxially oriented tapes. In such a uniaxially oriented tape, the stretching direction (oriented direction) corresponds to the length direction of the tape.

In the mesh structure formed from the nonwoven fabric prepared by laminating such uniaxially oriented tapes, a plurality of uniaxially oriented tapes corresponding to warps are arranged in parallel at a predetermined interval, and the arranged tapes correspond to one uniaxially oriented body. Meanwhile, the other uniaxially oriented body is prepared by similarly arranging a plurality of uniaxially oriented tapes corresponding to wefts in parallel at a predetermined interval and laminating the tapes into a uniaxially oriented tape group. Warps and wefts mentioned here are used for defining the relative relation of tapes and can be used interchangeably. Here, a uniaxially oriented tape group and another uniaxially oriented tape group are laminated in such a way that the respective length directions, or the oriented directions substantially orthogonally cross. Then, the contact faces of the warps and the wefts are heated and welded to form a mesh nonwoven fabric as the third mesh structure. In this case, the heat welding or bonding manner is the same as in the first mesh structure. When the uniaxially oriented tape is composed of two layers of a thermoplastic resin layer and a linear low-density polyethylene layer, the tapes are laminated in such a way that the linear low-density polyethylene layer of the warps comes in contact with the linear low-density polyethylene layer of the wefts. The composition, the thicknesses, the width, and the distance between tapes of the uniaxially oriented tapes corresponding to the warps may be the same as or different from those of the uniaxially oriented tapes corresponding to the wefts as long as the composition, the layer thickness, and other requirements of the uniaxially oriented body of the present invention are satisfied. The woven fabric can be produced in the same manner except that a plurality of uniaxially oriented tapes are woven in place of laminating.

The third mesh structure also has substantially the same properties as those of the first mesh structure in terms of a fiber weight per unit area, a tensile strength, a thickness of the linear low-density polyethylene layer, and an adhesive force between the uniaxially oriented bodies, and achieves the same effect. In the present embodiment, the adhesive force between the uniaxially oriented bodies means the adhesive force between the uniaxially oriented tape group corresponding to the warps and the uniaxially oriented tape group corresponding to the wefts, and the value is also within the range as described while the first mesh structure is exemplified. The tensile strength is a tensile strength in at least one of direction of the oriented direction of uniaxially oriented tapes corresponding to the warps and the oriented direction of uniaxially oriented tapes corresponding to the wefts, or a tensile strength in both directions of the oriented direction of uniaxially oriented tapes corresponding to the warps and to the wefts.

Fourth Mesh Structure: Mesh Nonwoven Fabric of Split Web and Uniaxially Oriented Tape A fourth mesh structure is a nonwoven fabric produced by laminating a uniaxially oriented body including stem fibers stretching parallel with each other and branch fibers connecting the adjacent stem fibers to each other, on a uniaxially oriented tape group layer.

In the description of the fourth mesh structure, a mesh structure produced by laminating three layers of uniaxially oriented bodies will be described. In other words, the fourth mesh structure of the present invention typically includes a first uniaxially oriented body, a second uniaxially oriented body, and a third uniaxially oriented body. The first uniaxially oriented body is a split web 2; the second uniaxially oriented body is composed of a plurality of uniaxially oriented tape groups; and the third uniaxially oriented body is composed of a plurality of uniaxially oriented tape groups that obliquely cross with the uniaxially oriented tape groups constituting the second uniaxially oriented body.

Such a mesh structure is a nonwoven fabric produced by laminating a split web including stem fibers stretching parallel with each other and branch fibers connecting the adjacent stem fibers to each other, a first uniaxially oriented tape group layer including uniaxially oriented tape groups that stretch parallel with each other and obliquely cross with the oriented direction of the split web, and a second uniaxially oriented tape group layer including second uniaxially oriented tape groups that stretch parallel with each other and obliquely cross with the oriented direction of the split web from the opposite direction to the first uniaxially oriented tape group layer. In the fourth mesh structure, the first uniaxially oriented tapes are laminated on the split web at an angle of α' to the oriented direction of the split web. The second uniaxially oriented tapes are laminated at an angle of α to the oriented direction L in such a way as to obliquely cross with the first uniaxially oriented tapes. In this case, the angles α and α' may be the same or different and can be 45 to 60 degrees, for example.

The production methods of the split web and the uniaxially oriented tapes constituting the fourth mesh structure are as described for the first and third mesh structures, and the split web and the uniaxially oriented tapes can be produced in the same manner. The web and the tapes can be laminated, and the contact areas can be welded or bonded, yielding the fourth mesh structure.

As uniaxially oriented bodies other than the uniaxially oriented tapes in the fourth mesh structure, webs having the following patterns can also be used in addition to the detailed-described split web: for example, a web prepared by forming a large number slits in the width direction in a raw film having substantially the same structure as the split web, and then stretching the film in the width direction at the same stretch ratio as in the split web, or a web having a pattern rotated by ±90° with respect to the split web in a planer view; and slit webs having similar patterns to this. Also in this case, the slit web, the first uniaxially oriented tape group layer, and the second uniaxially oriented tape group layer can be laminated in such a way as to obliquely cross with respect to the oriented direction in the same manner as the above. Alternatively, a mesh structure may be produced by laminating two layers of a split web or a slit web and a first uniaxially oriented tape group layer in such a way that the oriented direction of the split web or the slit web crosses with the length direction of the uniaxially oriented tape group.

The fourth mesh structure also has substantially the same properties as those of the first mesh structure in terms of a fiber weight per unit area, a tensile strength, a thickness of the linear low-density polyethylene layer, and an adhesive force between the uniaxially oriented bodies, and achieves the same effects. The adhesive force between the uniaxially oriented bodies means the adhesive forces between all the uniaxially oriented bodies including a split web or a slit web and a single layer or two layers of uniaxially oriented tape group layers, and the value has the same numerical value characteristics within the range described while the first mesh structure is exemplified. The tensile strength is a tensile strength in at least one direction of the oriented direction of a split web or a slit web and the oriented direction of a uniaxially oriented tape group, or a tensile strength in both direction of the oriented direction of a split web or a slit web and the oriented direction of a uniaxially oriented tape group. The tensile strength value is within the range as described while the first mesh structure is exemplified.

Second Embodiment: Reinforced Laminate

According to a second embodiment, the present invention relates to a reinforced laminate. The reinforced laminate is a reinforced laminate that includes at least one of the first to fourth mesh structures and mesh structures pertaining to modified embodiments thereof and is produced by laminating such a mesh structure as a reinforcing material on a subject to be reinforced. When such a reinforced laminate is produced, install properties to a process apparatus and processability and workability when a mesh structure is processed with a machine in order to laminate the mesh structure on a subject to be reinforced can be improved, and thus the mesh structure is applicable for reinforcement of various subjects to be reinforced while the production cost is reduced. Examples of the subject to be reinforced include, but are not limited to, films/sheets, foamed films/sheets, synthetic resin films/sheets such as porous sheets, Japanese paper/kraft paper, papers such as paperboard, rubber films/sheets, metal foils such as aluminum foil, various nonwoven fabrics such as dry nonwoven fabrics including melt-blown nonwoven fabric and spunlace nonwoven fabric and wet nonwoven fabrics including pulp nonwoven fabric, woven fabrics such as cloth, metals, ceramics, and glass.

The reinforced laminate pertaining to the present embodiment is used for leisure sheets, automobile hoods, covering materials for agricultural use, cement bags, asphalt bags, bags for synthetic resin pellets, base materials for adhesive tapes, and masking films, and the nonwoven fabric and the woven fabric can be effectively used as agricultural and gardening materials, construction materials, and household articles, such as covering materials for agricultural use, green covers for golf courses, filters, draining bags, various bags, oil adsorbents, flower wraps, house wraps, mats, wipers, and waste rags, for example.

EXAMPLES

The present invention will next be described in detail with reference to examples. However, the following examples are not intended to limit the present invention.

As the mesh structure pertaining to the present invention, samples having different material compositions, layer structure ratios, and fiber weight per unit areas were prepared, and the adhesive strength and the tensile strength in the length direction were measured and evaluated. Specifically, mesh nonwoven fabrics were produced by the method described with reference to FIGS. 4 and 5.

In each of Examples 1 to 3, a resin A was used as the thermoplastic resin layer 6 that is a main layer of a split web 2 as one uniaxially oriented body, and a resin B was laminated as the adhesion layers 7-1 and 7-2 on both sides of the thermoplastic resin layer 6 by a water-cooled inflation method. In the preparation of the split web 2, the stretch ratio in the longitudinal direction was 8. For a slit web 3 as the other uniaxially oriented body, the resin A was also used as the thermoplastic resin layer 6' that is a main layer. In Examples 1 and 2, the resin B was laminated as the adhesion layers 7-1' and 7-2' on both sides of the thermoplastic resin layer 6'; and in Example 3, the resin B was laminated as the adhesion layer 7-1' on one side of the thermoplastic resin layer 6', by a water-cooled inflation method. In the preparation of the slit web 3, the stretch ratio in the width direction was the same as the stretch ratio in the longitudinal direction. The split web 2 and the slit web 3 were bonded by heat welding at 121° C.

In Comparative Examples 1 to 3, mesh structures were produced in the same conditions in terms of layer structure, stretch ratio, and heat welding temperature as in Examples 1 to 3 except a resin C was used as the adhesion layer in place of the resin B.

Table 1 shows the thicknesses (thickness before stretching/thickness after stretching) of the respective layers in Examples 1 to 3, and Table 2 shows the thicknesses of the respective layers in Comparative Examples 1 to 3. The outer layer thickness is the thickness of an adhesion layer on one side. The resins used in the respective layers are as shown below. The resin B is a linear low-density polyethylene having long-chain branches prepared by polymerization with a metallocene catalyst.

Resin A: high-density polyethylene, HY444 (manufactured by Japan Polyethylene Corporation)
Resin B: linear low-density polyethylene, CB2001 (manufactured by Sumitomo Chemical Co., Ltd.)
Resin C: low-density polyethylene, LE541H (manufactured by Japan Polyethylene Corporation)

Fiber weight per unit areas, adhesive forces between uniaxially oriented bodies, and tensile strengths of the respective mesh structures produced in Examples and Comparative Examples were determined The adhesive force between uniaxially oriented bodies, or between a slit web and a split web was determined by using a tensile tester. To the center part of a test piece (a length of 200 mm, a width of 150 mm) cut out from a mesh structure, a U-shaped hook connected to a load cell of a tensile tester was attached. The bottom part of the test piece was fixed to the tensile tester. The test piece was elongated at a tensile speed of 500 mm/min, and an average amplitude of load indication values at a displacement of 40 to 90 mm was regarded as the adhesive force.

The tensile strength was determined as follows: a tensile tester was used, and both ends of a test piece (a length of 200 mm, a width of 50 mm) cut out from a mesh nonwoven fabric in the flow direction were fixed to clamps at a clamp distance of 100 mm Next, the test piece was elongated at a tensile speed of 200 mm/min, and a maximum strength was measured.

TABLE 1

|  |  | Example 1 | Example 2 | Example 3 |
|---|---|---|---|---|
| Main layer thickness | μm | 30 | 49.8 | 26.7 |
| Outer layer thickness | μm | 2.5 | 2.8 | 2.4 |
| Fiber weight per unit area | g/m² | 19 | 45 | 10 |
| Adhesive force | N | 6 | 7 | 4 |
| Tensile strength | N | 115 | 382 | 42 |

TABLE 2

|  |  | Comparative Example 1 | Comparative Example 2 | Comparative Example 3 |
|---|---|---|---|---|
| Main layer thickness | μm | 30 | 49.8 | 26.7 |
| Outer layer thickness | μm | 2.5 | 2.8 | 2.4 |
| Fiber weight per unit area | g/m² | 19 | 45 | 10 |
| Adhesive force | N | 6 | 7 | 4 |
| Tensile strength | N | 115 | 382 | 42 |

Each of Examples 1, 2, and 3 satisfied the required properties. In contrast, Comparative Example 1 was substantially equal in fiber weight per unit area and tensile strength, but had an adhesive force between uniaxially oriented bodies of 6 N. As the reinforcing material application, fibers constituting the uniaxially oriented bodies were peeled off, and the product was unusable as a mesh nonwoven fabric. Comparative Examples 2 and 3 were also substantially equal in fiber weight per unit area and tensile strength, but had an adhesive force between uniaxially oriented bodies of 6 N. As the reinforcing material application, fibers constituting the uniaxially oriented bodies were peeled off, and the product was unsuitable for practical use as a mesh nonwoven fabric.

Although detailed data are not shown, a second mesh structure produced by the production method shown in the modified example in the same conditions in terms of resin composition, layer thickness, and stretch ratio as in Examples 1 to 3 also had a fiber weight per unit area, an adhesive force, and a tensile strength within the scope of the present invention and had good adhesive force.

The mesh nonwoven fabric of the present invention is useful as packing materials, construction materials, sheets, bags, and covers.

DESCRIPTION OF REFERENCE NUMERALS 1 mesh nonwoven fabric
2 split web (mesh film)

21 stem fiber
22 branch fiber
2-1 longitudinal web
2-2 lateral web
3 slit web
6, 6' thermoplastic resin layer (mesh film)
7-1, 7-1' metallocene LLDPE layer (adhesion layer)
7-2, 7-2' metallocene LLDPE layer (adhesion layer)
L, T orientation axis

The invention claimed is:

1. A mesh structure comprising:
two or more uniaxially oriented bodies, wherein one of the uniaxially oriented bodies includes a thermoplastic resin layer and a first linear low-density polyethylene layer laminated on at least one side of the thermoplastic resin layer,
the mesh structure being produced by laminating or weaving the two or more uniaxially oriented bodies through the first linear low-density polyethylene layer in such a way that orientation axes of the two or more uniaxially oriented bodies cross,
wherein the first linear low-density polyethylene layer contains a linear low-density polyethylene having a long-chain branch with more than 20 carbon atoms in a molecular chain thereof, and
wherein the uniaxially oriented body includes the first linear low-density polyethylene layer laminated on one side of the thermoplastic resin layer and a second linear low-density polyethylene layer laminated on another side of the thermoplastic resin layer, and the first and second linear low-density polyethylene layers contain a linear low-density polyethylene having an MFR of 0.5 to 10 g/10 min and a density of 0.910 to 0.940 g/cm$^3$,
the mesh structure having properties of:
(1) a fiber weight per unit area of 5 to 70 g/m$^2$,
(2) a thickness of the first linear low-density polyethylene layer of 2 to 10 μm,
(3) an adhesive force between the uniaxially oriented bodies of 10 to 60 N, and
(4) a tensile strength of 20 to 600 N/50 mm.

2. The mesh structure according to claim 1, wherein the thermoplastic resin layer contains a high-density polyethylene having a melting point higher than a melting point of the first linear low-density polyethylene layer.

3. The mesh structure according to claim 1, wherein the one of the uniaxially oriented bodies is a uniaxially stretched multilayer inflation molded film.

4. The mesh structure according to claim 1, wherein the first linear low-density polyethylene layer contains a linear low-density polyethylene prepared by polymerization with a metallocene catalyst.

5. The mesh structure according to claim 1, the first and second linear low-density polyethylene layers contain a linear low-density polyethylene having an MFR of 1 to 5 g/10 min and a density of 0.915 to 0.930 g/cm$^3$.

6. The mesh structure according to claim 1, wherein the two or more uniaxially oriented bodies are at least one of a uniaxially oriented mesh film or uniaxially oriented tapes.

* * * * *